(12) United States Patent
Mestha et al.

(10) Patent No.: US 9,256,937 B2
(45) Date of Patent: Feb. 9, 2016

(54) ASSESSING PERIPHERAL VASCULAR DISEASE FROM A THERMAL IMAGE

(71) Applicant: Xerox Corporation, Norwalk, CT (US)

(72) Inventors: Lalit Keshav Mestha, Fairport, NY (US); Beilei Xu, Penfield, NY (US)

(73) Assignee: Xerox Corporation, Norwalk, CT (US)

(*) Notice: Subject to any disclaimer, the term of this patent is extended or adjusted under 35 U.S.C. 154(b) by 116 days.

(21) Appl. No.: 14/161,023

(22) Filed: Jan. 22, 2014

(65) Prior Publication Data

US 2015/0206301 A1 Jul. 23, 2015

(51) Int. Cl.
| | | |
|---|---|---|
| *G06K 9/00* | (2006.01) | |
| *G06T 7/00* | (2006.01) | |
| *G01J 5/10* | (2006.01) | |
| *G01J 5/08* | (2006.01) | |
| *A61B 6/00* | (2006.01) | |
| *G01J 5/00* | (2006.01) | |

(52) U.S. Cl.
CPC ............... *G06T 7/0012* (2013.01); *G01J 5/08* (2013.01); *G01J 5/10* (2013.01); *G01J 2005/0077* (2013.01); *G06T 2207/10048* (2013.01); *G06T 2207/30088* (2013.01); *G06T 2207/30104* (2013.01)

(58) Field of Classification Search
USPC ......... 382/100, 103, 106, 108, 128–134, 162, 382/168, 173, 181, 194, 199, 209, 219, 232, 382/254, 274, 276, 286–294, 305, 312, 382/165; 600/474, 481, 549; 348/77; 378/21

See application file for complete search history.

(56) References Cited

U.S. PATENT DOCUMENTS

| | | | |
|---|---|---|---|
| 8,868,157 B1* | 10/2014 | Soliz .................... | A61B 5/0077 600/474 |
| 2007/0225614 A1* | 9/2007 | Naghavi .................. | A61B 5/01 600/549 |
| 2008/0027330 A1 | 1/2008 | Naghavi et al. | |
| 2010/0081941 A1* | 4/2010 | Naghavi ................. | A61B 5/015 600/481 |
| 2013/0162796 A1* | 6/2013 | Bharara ............... | A61B 5/0077 348/77 |
| 2015/0150453 A1* | 6/2015 | Abreu .................. | A61B 5/0008 600/474 |

* cited by examiner

*Primary Examiner* — Seyed Azarian
(74) *Attorney, Agent, or Firm* — Philips E. Blair; Fleit Gibbons Gutman Bongini & Bianco P.L.

(57) ABSTRACT

What is disclosed is a system and method for assessing peripheral vascular disease from a thermal image captured using a thermal imaging system. In one embodiment the present method involves the following. First, a thermal image is received of a region of exposed skin of a peripheral body part of a subject being monitored for PVD. The thermal image was acquired by a thermal imaging system. Pixels in the thermal image each have a corresponding temperature value. The thermal image is analyzed to stratify the peripheral body part into a plurality of skin surface regions. A skin surface temperature for each respective skin surface region is identified based on pixels in the thermal image associated with those regions. The temperatures are then extracted such that a progression of temperatures can be ascertained. A method for forecasting the progression for future times is also disclosed.

21 Claims, 8 Drawing Sheets

ASSESSING PERIPHERAL VASCULAR DISEASE FROM A THERMAL IMAGE

TECHNICAL FIELD

The present invention is directed to systems and methods for assessing whether a subject of interest has peripheral vascular disease, and a method for forecasting the progression for future times from a thermal image captured using a thermal imaging system.

BACKGROUND

Poor circulation in a limb often gives rise to symptoms such as muscle cramping, pain or discomfort, and the like. Such symptoms may be signs of peripheral vascular disease (PVD). The prevalence of PVD varies considerably depending on the age of the population being studied. The incidence of symptomatic PVD increases with age from about 0.3% per year for men aged 40-55 years to about 1% per year for men aged over 75 years. Normally, PVD is assessed using sophisticated tests involving ultrasound imaging, magnetic resonance angiogram, computer tomography (CT) angiogram, or a catheter-based angiogram. Diagnosis is critical, as people with PVD are at a higher risk for tissue necrosis including heart attack and/or stroke. The present invention is directed towards assessing PVD and the progression of PVD for future times.

Accordingly, what is needed is a system and method for assessing whether a subject of interest has peripheral vascular disease from a thermal image captured using a thermal imaging system.

BRIEF SUMMARY

What is disclosed is a system and method for assessing whether a subject of interest has peripheral vascular disease from a thermal image captured using a thermal imaging system.

In one embodiment present method involves the following. First, a thermal image is received of a region of exposed skin of a peripheral body part of a subject of interest being monitored for peripheral vascular disease. The thermal image was acquired by a thermal imaging system. The thermal image comprises a plurality of pixels with each pixel corresponding to a skin surface temperature. The peripheral body part can be, for instance, an arm, leg, hand, foot, fingers, or toes. The thermal image is then analyzed to stratify the peripheral body part into a plurality of skin surface regions. The stratification can be determined by the anatomical structure or the direction of blood supply. A skin surface temperature for each respective skin surface region is identified based on pixels in the thermal image associated with each region. The skin surface temperatures are then extracted such that a progression of temperatures can be ascertained. Thereafter, a determination is made whether the subject has a peripheral vascular disease. In another embodiment, the thermal image contains an image of a second similar peripheral body part of the subject. A skin surface temperature is then identified based on pixels in the thermal image associated with each respective region. Skin surface temperature differentials are determined between the two body parts. The temperature differentials are used to facilitate an assessment whether the subject has peripheral vascular disease and whether the disease is likely to worsen over time had the subject not received treatment.

Many features and advantages of the present system and method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is disclosed is a system and method for assessing whether a subject of interest has peripheral vascular disease from a thermal image captured using a thermal imaging system and progression of the disease over time had the subject not received treatment.

NON-LIMITING DEFINITIONS

A "subject of interest" refers to a living subject having a physiological function. Although the term "person" or "patient" may be used throughout this text, it should be appreciated that the subject may be something other than a human. Such terms are not to be viewed as limiting the scope of the appended claims strictly to human beings.

"Peripheral Vascular Disease (PVD)", also referred to as Peripheral Arterial Disease (PAD), Peripheral Artery Occlusive Disease, and Peripheral Obliterative Arteriopathy, is a disorder which arises from a partial or full obstruction of an artery which is not within the coronary, aortic arch vasculature, or brain. Peripheral arteries may be occluded by a thrombus, an embolus, aortic dissection, or acute compartment syndrome. The occluded artery gives rise to an acute or chronic lack of blood supply (ischemia) to downstream tissues. The lack of blood supply causes deprived tissues to undergo necrosis.

Figure 1:
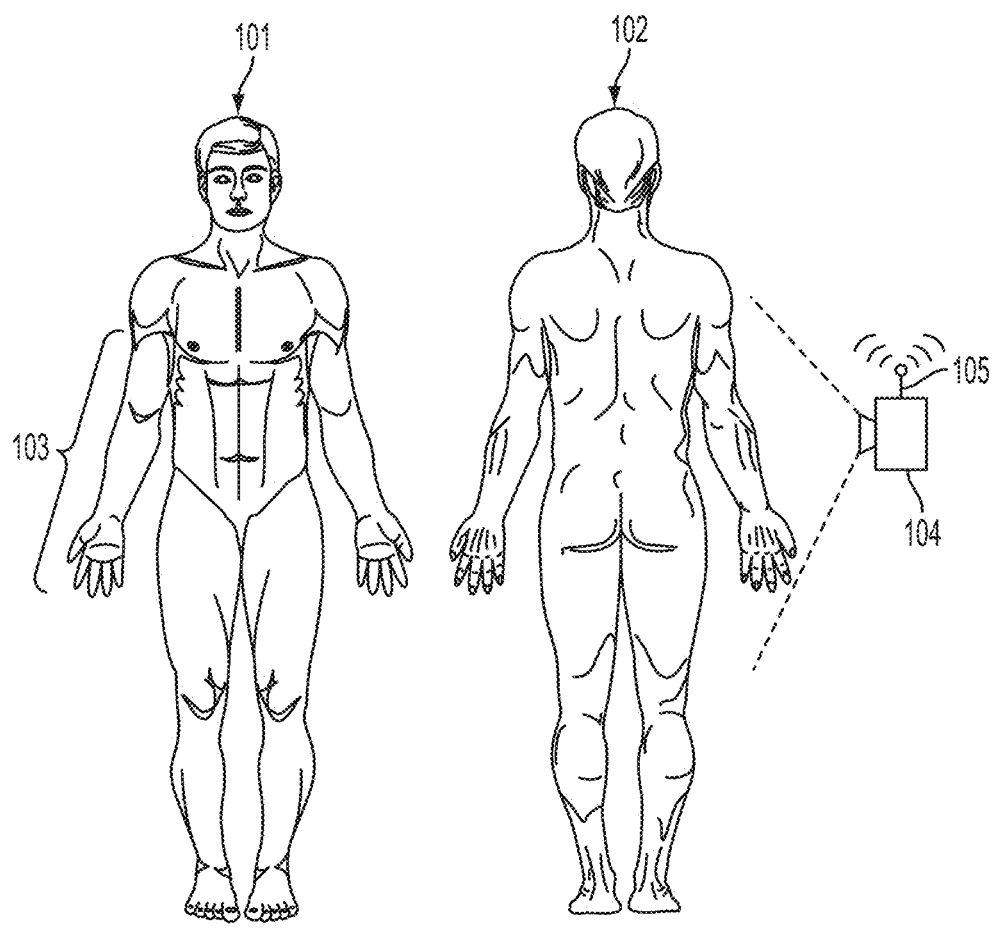
FIG. 1 illustrates an anterior (palmar) and dorsal view of a subject of interest.

A "peripheral body part" refers to an arm, leg, hand, foot, fingers, and toes. FIG. 1 shows an anterior view 101 and a dorsal view 102 of various peripheral body parts of a subject of interest.

An "area of exposed skin" refers to an unobstructed view of the exposed skin of the peripheral body part, as seen through a lens of a thermal imaging camera. FIG. 1 illustrates several areas of exposed skin of a subject of interest.

A "thermal camera" or, more generally, a "thermal imaging system" refers to a thermal camera with single or multiple spectral bands, as are commonly understood in the arts which are capable of capturing thermal images of a subject of interest in a desired temperature band. FIG. 1 further illustrates one embodiment of an example thermal camera 104 capturing a thermal image of the dorsal view of the subject's right arm 103. Antenna 105 provides an example means by which the captured thermal image(s) are wirelessly communicated to a remote computing device (not shown) for processing in accordance with the teachings hereof. Specialized processors inside the thermal camera associate pixel color values with different temperatures and provide output color values of each pixel in the resulting thermal image. The resolution for a thermal camera is effectively the size of the pixel. Smaller pixels mean that more pixels will go into the image for the same region of interest giving the resulting image higher resolution and thus better spatial definition. Because the amount of black-body radiation emitted by an object increases with the object's temperature, variations in temperatures of objects are observable in a thermal image. Thermal cameras generally consist of five primary components: 1) optics comprising specialized focal plane arrays (FPAs) that respond to defined wavelengths of the infrared range of the electromagnetic (EM) spectrum (~7.5 to ~14 µm); 2) a detector for detecting radiation in the infrared range; 3) an amplifier for amplifying the received radiation; 4) a display for viewing the captured images; and 5) signal processing hardware such as: a CPU, memory, storage, for performing mathematical algorithms which interpret data and construct an IR image. Common thermal imaging systems include: InSb, InGaAs, HgCdTe, and QWIP FPA. Newer technologies utilize uncooled microbolometers as FPA sensors. Thermal cameras offer a relatively large dynamic range of temperature settings. However, for the purposes hereof, it is preferable that the camera's temperature range be relatively small centered around subject's body surface temperature so that small temperature variations are amplified in terms of pixel color changes to provide a better measure of temperature variation. Thermal camera systems are readily available in various streams of commerce.

Figure 2:
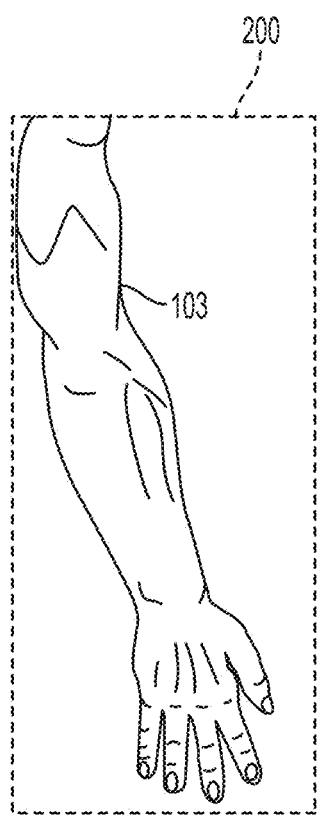
FIG. 2 shows an example thermal image of an area of exposed skin of the right arm of the subject of FIG. 1.

A "thermal image" is an image captured using a thermal camera. FIG. 2 shows an example thermal image 200 of an area of exposed skin of the right arm 103 of the subject of FIG. 1 acquired by the thermal camera 103. It should be appreciated that the thermal image of FIG. 2 is illustrative for explanatory purposes. Each thermal image comprises a plurality of pixels. Each pixel in the thermal image has a corresponding temperature value associated therewith.

"Receiving a thermal image" is intended to be widely construed and includes: retrieving, receiving, capturing, acquiring, or otherwise obtaining a thermal image for processing in accordance with the methods disclosed herein. The thermal image can be retrieved from a memory or storage device of the thermal imaging device, or obtained from a remote device over a network. The image may be retrieved from a media such as a CDROM or DVD. The image may be downloaded from a web-based system which makes such images available for processing. The thermal image can also be retrieved using an application such as those which are widely available for handheld cellular devices and processed on the user's cellphone or other handheld computing device such as an iPad or tablet.

Example Flow Diagram

Figure 3:
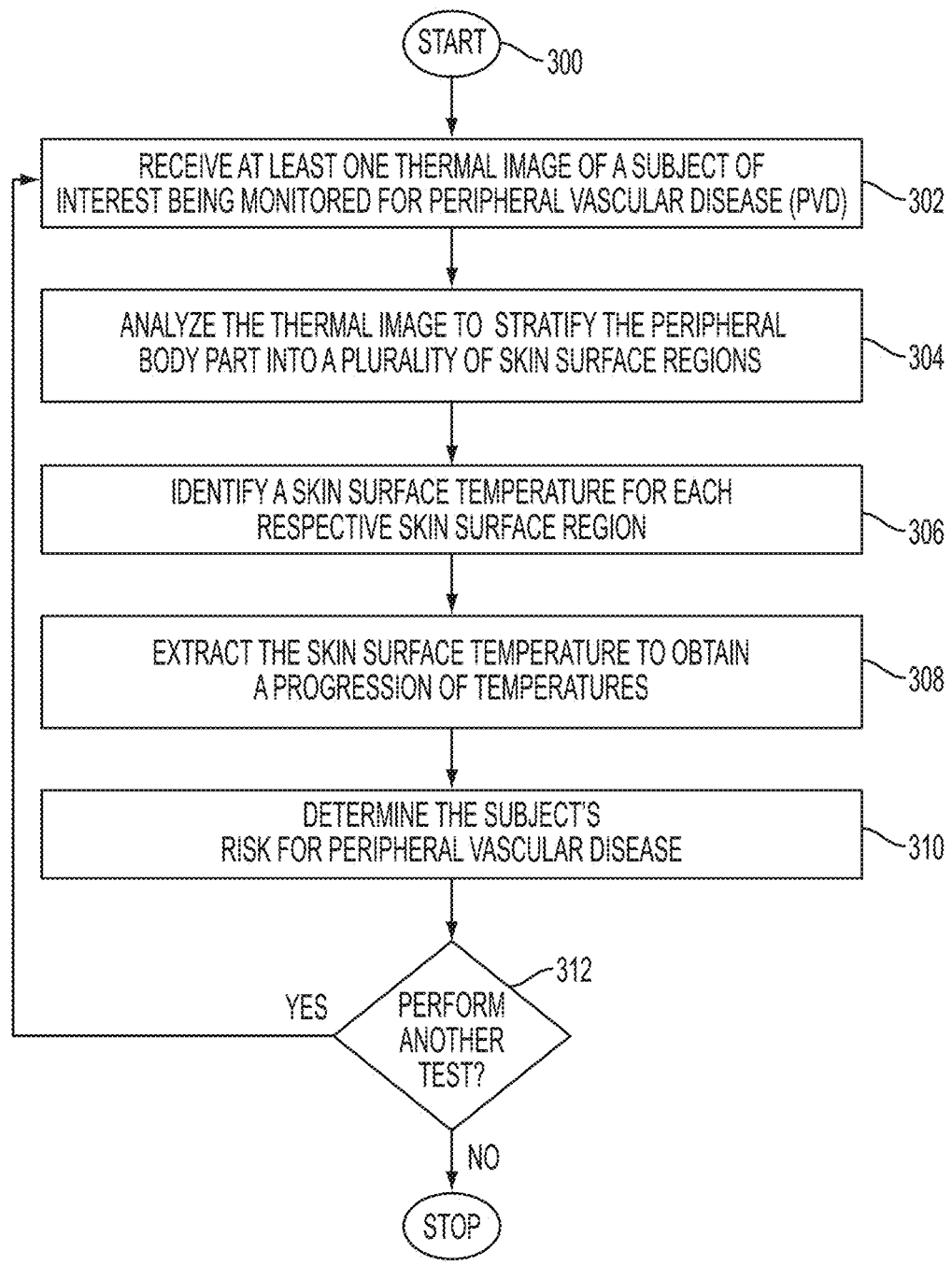
FIG. 3 is a flow diagram of one embodiment of the present method for assessing peripheral vascular disease.

Reference is now being made to the flow diagram of FIG. 3 which illustrates one example embodiment of the present method for assessing peripheral vascular disease from a thermal image. Flow processing begins at 300 and immediately proceeds to step 302.

Figure 6:
FIG. 6 shows a thermal image of the left and right foot of a PVD patient.

At step 302, receive at least one thermal image of a subject of interest being monitored for peripheral vascular disease (PVD). The thermal image was captured using a thermal camera with the temperature range set to center at a temperature of a skin surface of a peripheral body part of the subject. One example thermal image of a peripheral body part is shown in FIG. 2 other example is shown in FIG. 6.

Figure 4:
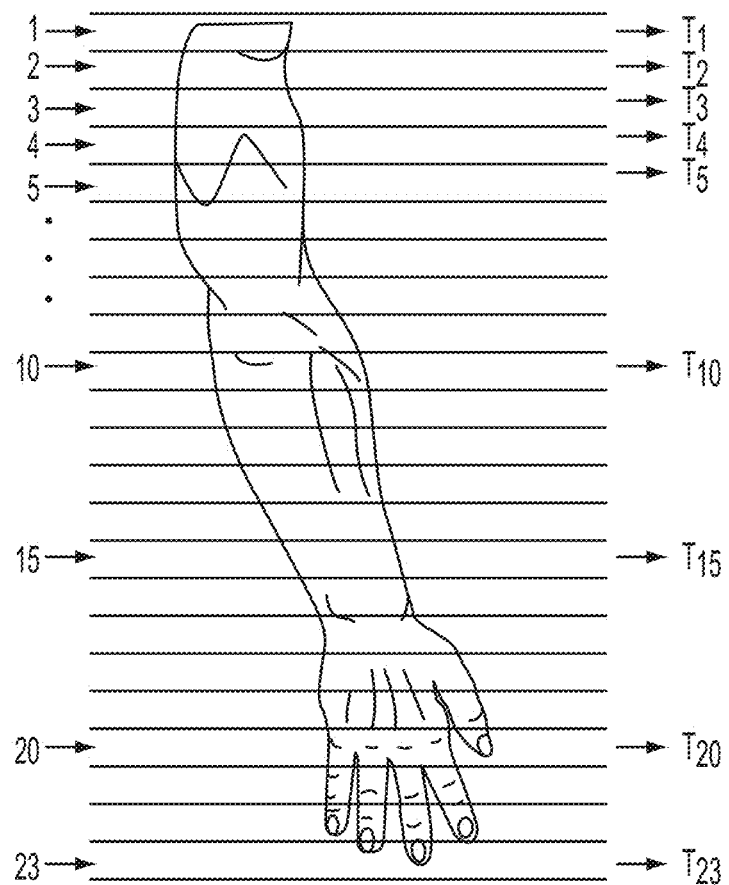
FIG. 4 shows the peripheral body part of FIG. 2 having been stratified into separate regions of skin surface in accordance with the teachings hereof.

At step 304, analyze the thermal image to stratify the peripheral body part into a plurality of skin surface regions. FIG. 4 shows the peripheral body part of FIG. 2 having been stratified into separate regions of skin surface. For explanatory purposes, the skin surface of the right arm has been divided up into 23 equal-sized regions. It should be appreciated that the total number of skin surface regions is user-defined as there can be more regions or less regions, depending on the implementation and the level of granularity desired. Moreover, the regions don't have to be equal-sized, i.e., some regions may be smaller while other regions are larger.

At step 306, identify a skin surface temperature for each respective skin surface region. A given temperature T of each respective skin surface region is based on the values of pixels in the thermal image associated with that particular region. In order to derive a temperature value for a given region, pixel values of that region may be averaged over at least a portion of the skin surface region. Alternatively, a weighted averaging is performed of pixels over at least a portion of the skin surface region to obtain a temperature value. Other methods for determining at least one temperature value for each stratified region of exposed skin in the thermal image may be employed. As shown in FIG. 4, corresponding temperature values $T_1$ through $T_{23}$ have been identified for each of the 23 regions of skin surface in the thermal image of FIG. 2. Each temperature could represent the mean of all pixels for corresponding region.

Figure 5:
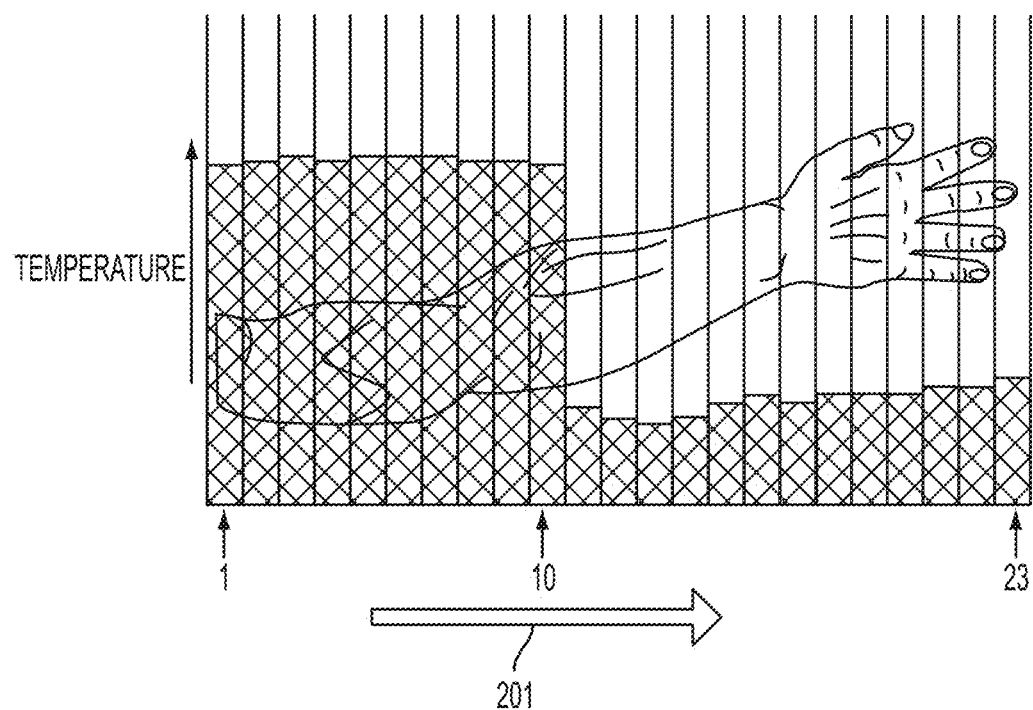
FIG. 5 shows an example histogram of identified skin surface temperatures overlaid on the various stratified regions of FIG. 4.

At step 308, extract the skin surface temperatures such that a progression of temperatures can be assessed. In one embodiment, the extraction comprises a difference of histograms of temperature values from difference regions. FIG. 5 shows an example extraction (histogram) of identified skin surface temperatures (of step 306) overlaid onto the various stratified regions of the peripheral body part.

At step 310, determine the subject's risk for peripheral vascular disease. As shown by way of illustration in FIG. 5, the skin surface tissue due to the flow of normal blood supply into the subject right arm has a temperature which remains fairly constant until region #10 where the temperature suddenly drops. This may be due to an acute occlusion in the arterial pathway of that region. As such, the tissue which is downstream of that blockage is deprived of blood and therefore has a different (cooler) temperature than the tissue which is upstream of the blockage receiving a normal blood supply. It should be understood that the temperatures of FIG. 5 are exaggerated for illustration and discussion purposes. Also, it should be understood that the temperatures for the same region could be different for different subjects. Real skin surface temperature values will, of course, necessarily depend on what the measured temperature values are of the subject's skin surface above and below the occlusion. The medical professional will then assess, based on the extraction of surface temperatures for both hands (shown by way of example in FIG. 5 for one hand), whether the subject has PVD. In various embodiments, the development of PVD can be tracked over time by repeated testing.

At step 312, a determination is made whether to perform another test for PVD. Another test may involve this same subject or a different subject. If it is determined that another test is to be performed then processing repeats with respect to step 302 wherein another thermal image is received and processed accordingly. In another embodiment, a second test may be performed for this same subject using the same thermal image using a different level of stratification. In this embodiment, processing would repeat with respect to step 304 and the thermal image would be analyzed using a different level of stratification. Such embodiments are intended to fall within the scope of the appended claims.

Figure 7:
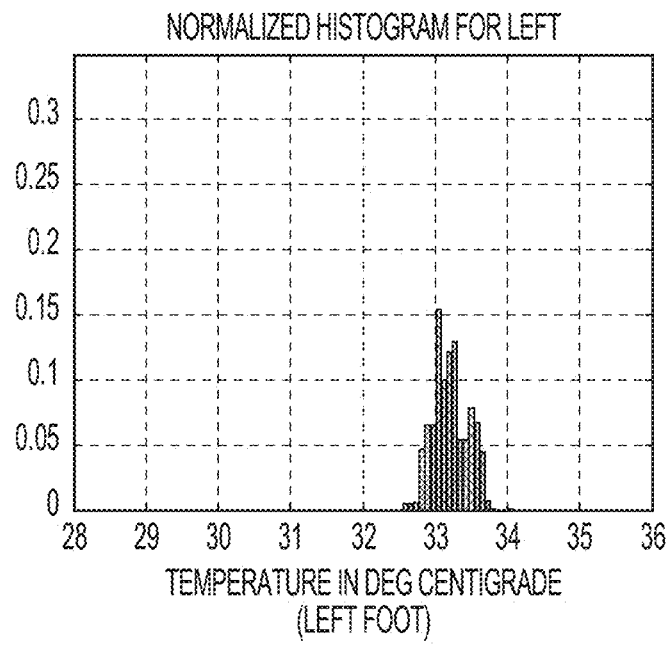
FIG. 7 is a histogram of normalized temperatures for the left foot in the thermal image of FIG. 6.
Figure 8:
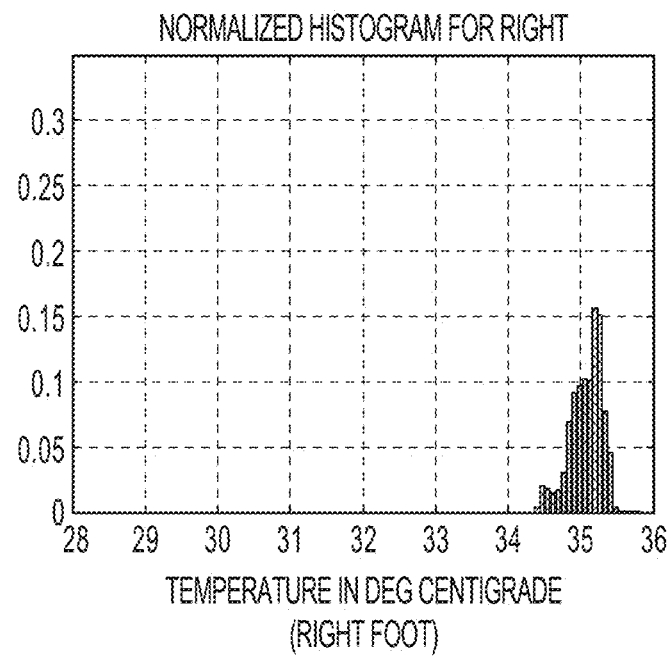
FIG. 8 is a histogram of normalized temperatures for the right foot in the thermal image of FIG. 6.

In another embodiment, PVD can be assessed for the subject by a comparison temperature values obtained for another similar peripheral body part. FIG. 6 shows a thermal image of the left and right foot of a PVD patient. FIG. 7 is a histogram of normalized temperature values for the left foot in the thermal image of FIG. 6. FIG. 8 is a histogram of normalized temperature values for the right foot in the thermal image of FIG. 6.

It should be appreciated that the flow diagrams depicted herein are illustrative. One or more of the operative steps illustrated therein may be performed in a differing order. Other operations may be added, modified, enhanced, or consolidated. Variations thereof are intended to fall within the scope of the appended claims.

Predictive Model

We describe below an example of a predictive model from 3 quantitative features, $S_{intersection}$ (or deltaE), size under temperature contour, temperature spread (e.g., 1σ). Since all these parameters are interdependent, in the vector AR model, we consider the dependence of one parameter on the other parameter while predicting the new values in future time. So in the vector AR model, for predicting 3 parameters, the measurements obtained from the camera are represented in a 3×1 vector defined by:

$$y(n) = \begin{bmatrix} F_1(n) - F_1(0) \\ F_2(n) - F_2(0) \\ F_3(n) - F_3(0) \end{bmatrix} \quad (1)$$

where $F_1(n)$, $F_2(n)$, and $F_3(n)$ denote the 3 features and the parameters at the beginning of the count corresponds to time index, n=0.

The predicted output can be given as follows:

$$\hat{y}(n) = -\sum_{i=1}^{P} A_i y(n-i) \quad (2)$$

The error signal between measured and predicted outputs is given by:

$$e(n) = y(n) - \hat{y}(n) = y(n) + \sum_{i=1}^{P} A_i y(n-i) \quad (3)$$

where $A_i$ for i=1, ..., P are 3×3 matrices which define the vector auto regressive matrix coefficients. The prediction error is assumed to be zero mean white noise process with unknown covariance matrix Σ. The error is minimized in the minimum mean squares sense, (similar to the scalar case).

The mean square error (MSE) is given by:

$$E(e^2(n)) = E[e(n)e^T(n)] \quad (4)$$

$$E\left[\left(y(n) + \sum_{i=1}^{P} A_i y(n-i)\right)\left(y^T(n) + \sum_{i=1}^{P} y^T(n-i)A_i^T\right)\right] =$$

$$R_{yy}(0) + \sum_{i=1}^{P} A_i R_{yy}^T(i) + \sum_{i=1}^{P} R_{yy}(i)A_i^T + \sum_{i=1}^{P}\sum_{j=1}^{P} A_i R_{yy}(j-i)A_j^T$$

where $R_{yy}(i)$ is the 3×3 correlation matrix of the output of the model at lag i and is given:

$$R_{yy}(i) = \begin{bmatrix} r_{F_1 F_1}(i) & r_{F_1 F_2}(i) & r_{F_1 F_3}(i) \\ r_{F_2 F_1}(i) & r_{F_2 F_2}(i) & r_{F_2 F_3}(i) \\ r_{F_3 F_1}(i) & r_{F_3 F_2}(i) & r_{F_3 F_3}(i) \end{bmatrix} \quad (5)$$

Since y(n) is real, $R_{yy}(-i)=R_{yy}^T(i)$, and $r_{xx}(i)$ is the autocorrelation of the feature parameter. The diagonal elements of the positive definite matrix $R_{yy}(i)$ are the autocorrelation of the three components of the feature parameter vector and the off diagonal elements are a measure of correlation between the three coordinates of the feature parameter vector. We now optimize the cost function given by Eq. (4) with respect to matrix $A_i$. The result is the Yule-Walker equation and is given by:

$$\begin{bmatrix} R_{yy}(0) & R_{yy}(1) & \cdots & R_{yy}(P) \\ R_{yy}(1) & R_{yy}(0) & \cdots & R_{yy}(P-1) \\ \vdots & \vdots & & \vdots \\ R_{yy}(P) & R_{yy}(P-1) & & R_{yy}(0) \end{bmatrix}\begin{bmatrix} A_0 \\ A_1 \\ \vdots \\ A_P \end{bmatrix} = \begin{bmatrix} \Sigma \\ 0 \\ \vdots \\ 0 \end{bmatrix} \quad (6)$$

where $A_0$ is a 3×3 matrix with $A_0(i,j)=1$, 0 is a 3×3 matrix of zero elements, and E is the 3×3 covariance matrix of the prediction error e(n). Σ is the covariance matrix of the prediction error function and is given by:

$$\Sigma = R_{yy}(0)R_{yy}(1)A_1^T + R_{yy}(2)A_2^T + \ldots + R_{yy}(P)A_P^T \quad (7)$$

After estimating the vector auto regression matrix coefficients $\{A_i\}_{i=1}^{P}$, we can predict the new values of $\hat{F}_1(n)$, $\hat{F}_2(n)$ and $\hat{F}_3(n)$ from P previous values of the measurements using the following relationship:

$$\hat{y}(n) = c - \sum_{i=1}^{P} A_i y(n-i) \quad (8)$$

where $c=[F_1(0) \; F_2(0) \; F_3(0)]^T$ represents the initial values obtained from the past signal which is the same as the value of the time-series signal just before the event occurred (i.e., just before the prediction starts).

It should be appreciated that the model of Eq. (8) can be used to capture systematic changes in feature parameters and the model can be used to predict future values of the parameter set. The model can be run for P number of temporal (longitudinal) training data set. Moreover, there are other time-series models such as, for example, the recursive least square model, or a dynamic state space model.

which also be employed where additional information about the condition of the disease can be integrated.

Networked Imaging Processing System

Figure 9:
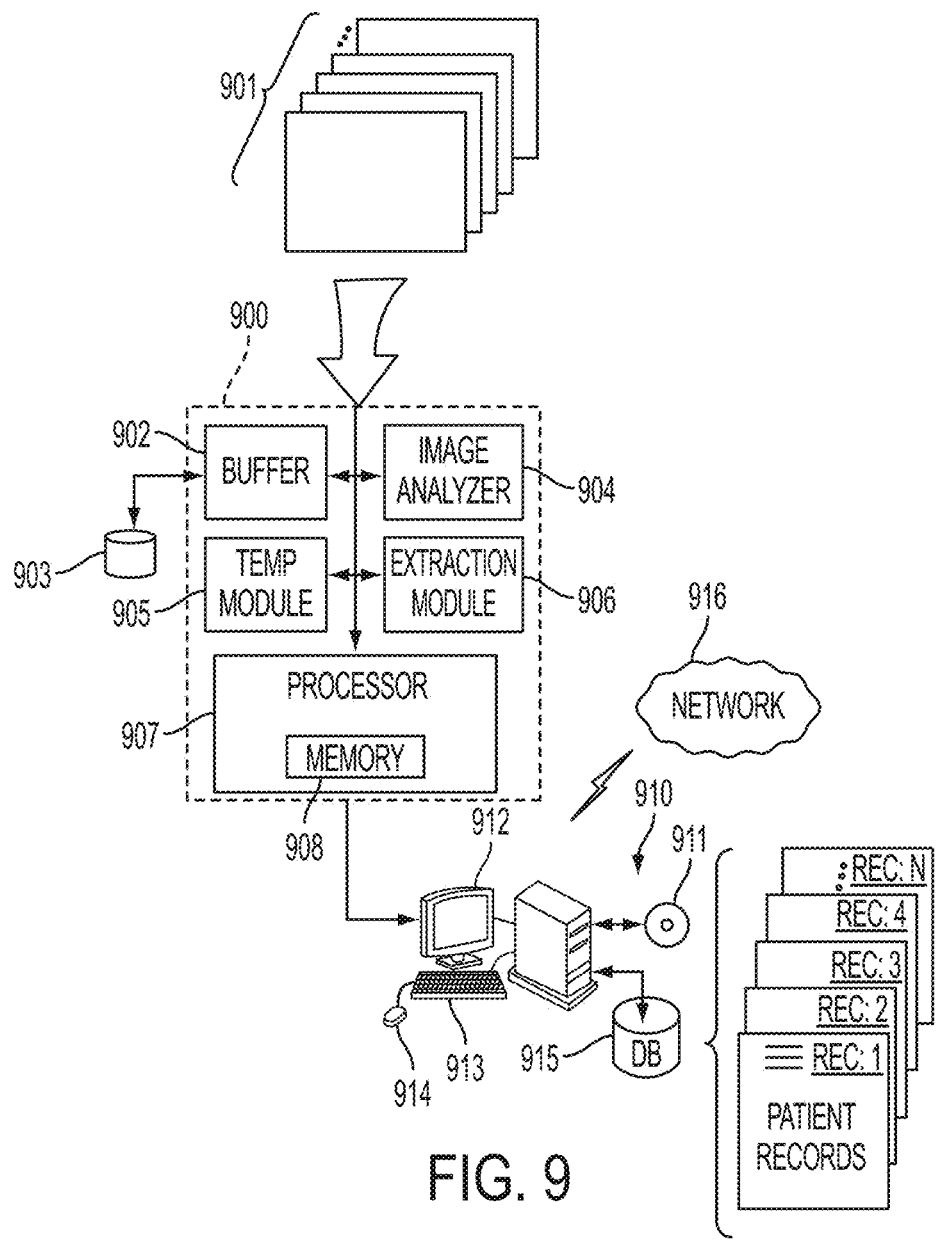
FIG. 9 shows a block diagram of an example system for performing various aspects of the teachings hereof as described with respect to the flow diagram of FIG. 3.

Reference is now being made to FIG. 9 which shows a block diagram of an example system for performing various aspects of the teachings hereof as described with respect to the flow diagram of FIG. 3.

In FIG. 9, image processing system 900 receives at least one thermal image, collectively at 901, into Buffer 902 which may be further configured to also store data, mathematical formulas and other representations to facilitate processing of the image in accordance with the teachings hereof. Such data can be stored to storage media 903. Image Analyzer 904 analyzes the received thermal image to stratify the peripheral body part into a plurality of skin surface regions. Temp Module 905 identifies skin surface temperatures for each respective skin surface region based on the values of pixels in the thermal image associated with each region. Extraction Module 906 extracts the skin surface temperatures such that a progression of temperatures can be ascertained. In this embodiment, Processor 907 and Memory 908 function to determined, via the execution of machine readable program instructions, facilitates an assessment of whether the subject has PVD and to determine a progression of PVD using a predictive model. Further, the processor and memory function to support the processing requirements of the modules and processing units of system 900. The image processing system 900 is shown in communication with a workstation.

Workstation 910 has a computer case 12 which houses a motherboard with a processor and memory, a communications link such as a network card, graphics card, and the like. The workstation has hardware which reads/writes to a computer readable media 911 such as a floppy disk, CD-ROM, DVD, USB-Drive, etc. The workstation further includes a display device 912 such as a CRT, LCD, touch screen, etc., a keyboard 913 and a mouse 914. The workstation is shown implementing a database 916 wherein patient records are stored, manipulated, and retrieved in response to a query. Such records, in various embodiments, take the form of patient medical history stored in association with information identifying the patient along with information regarding the peripheral body part, identified regions of interest, camera settings, wavelengths of interest, temperature values associated with various stratifications of skin surface regions, mathematical representations and data values used to process the thermal image and temperature progressions for a medical diagnosis, and the like. Although the database is shown as an external device, the database may be internal to the workstation mounted, for example, on a hard disk therein. The workstation is placed in communication with one or more remote devices over a network 916, which may comprise a wired or wireless connection. Any of the values, images, results, and the like, which are obtained or produced by the system of FIG. 9 may be communicated to one or more remote devices over the network.

It should be appreciated that the workstation has an operating system and other specialized software configured to display a wide variety of numeric values, text, scroll bars, pull-down menus with user selectable options, and the like, for entering, selecting, or modifying information displayed on the display device. The embodiment shown is only illustrative. Although shown as a desktop computer, it should be appreciated that the workstation can be a smartphone, laptop, mainframe, client/server, or a special purpose computer such as an ASIC, circuit board, dedicated processor, or the like.

Each module of the image processing system 900 may have a specialized processor executing machine readable program instructions for performing their intended functions. A module may comprise an ASIC, an electronic circuit, a special purpose processor, and the like. A plurality of modules may be executed by a single special purpose computer system or a plurality of computer systems operating in parallel. Modules may include software/hardware which may further comprise an operating system, drivers, controllers, and other apparatuses some or all of which may be connected via a network. Various modules may designate one or more components. A plurality of modules may collectively perform a single function.

Various aspects of the systems and methods described herein are intended to be incorporated in an article of manufacture which may be shipped, sold, leased, or otherwise provided separately either alone or as part of a product suite. The above-disclosed features and functions or alternatives thereof, may be combined into other systems and applications. Presently unforeseen or unanticipated alternatives, modifications, variations, or improvements may become apparent and/or subsequently made by those skilled in the art and, further, may be desirably combined into other different systems or applications. Changes to the above-described embodiments may be made without departing from the spirit and scope of the invention. The teachings of any printed publications including patents and patent applications, are each separately hereby incorporated by reference in their entirety.

What is claimed is:

1. A computer implemented method for assessing peripheral vascular disease from a thermal image, the method comprising:

receiving a thermal image of an area of exposed skin of at least one peripheral body part of a subject of interest being monitored for peripheral vascular disease, said thermal image being acquired by a thermal imaging system, said thermal image comprising a plurality of pixels, the value of each pixel corresponding to a skin surface temperature;

analyzing said thermal image to stratify said at least one peripheral body part into a plurality of skin surface regions;

identifying skin surface temperatures for each respective skin surface region based on pixels in said thermal image associated with each region; and determining, by a processor executing machine readable program instructions, based on temperature changes of said at least one said surface region of said peripheral body part, whether said subject has peripheral vascular disease, comprising any of: exceeding a threshold of the average temperature from another similar said surface region, exceeding a threshold of high-order statistics of temperature from another similar surface region, a comparison of temperatures between said peripheral body part and a second similar peripheral body part of said subject, a comparison of temperatures retrieved from a database, a comparison of temperatures of a similar peripheral body part obtained at a different time, and any combinations hereof, wherein said threshold is calculated based on any of: a histogram of temperature distributions of said skin surface regions, and a color difference of said thermal image of said skin surface region.

2. The method of claim 1, wherein said peripheral body part is any of: arm, leg, hand, foot, fingers, and toes.

3. The method of claim 1, wherein said thermal imaging system is any of: a single-band infrared camera, a multi-band infrared camera in the thermal range, and a hyperspectral infrared camera in the thermal range.

4. The method of claim 1, further comprising:
analyzing said thermal image to stratify a second peripheral body part into a plurality of skin surface regions;
identifying skin surface temperatures for each skin surface region of said similar second peripheral body part based on pixels in said thermal image associated with each respective region to obtain temperature differentials across said stratified skin surface regions;
comparing said temperature differentials of said first and second peripheral body parts; and
determining, as a result of said comparison, whether a subject has peripheral vascular disease.

5. The method of claim 1, wherein identifying said skin surface temperatures based on pixels in said thermal image comprising any of:
averaging pixel values over at least a portion of said skin surface region; and
weighted averaging said pixels over at least a portion of said skin surface region.

6. The method of claim 1, wherein thermal images are acquired of said subject's peripheral body part at different times to assess a progression of peripheral vascular disease over time using a predictive model.

7. The method of claim 6, wherein said predictive model is any of: an autoregressive model, a recursive least square model, and a dynamic state space model.

8. The method of claim 1, wherein determining whether said subject has peripheral vascular disease further comprises:
retrieving, from a database, temperatures of a peripheral body part; and
comparing said retrieved temperature values to said subject's temperature values from a reference thermal image.

9. The method of claim 8, wherein said retrieved temperatures are associated with a peripheral body part of another subject.

10. The method of claim 1, wherein, in advance of analyzing said thermal image, further comprising processing said thermal image to isolate pixels associated with said area of exposed skin.

11. A system for assessing peripheral vascular disease from a thermal image, the system comprising:
a storage device; and
a processor in communication with said storage device, said processor executing machine readable instructions for performing:
receiving a thermal image of an area of exposed skin of at least one peripheral body part of a subject of interest being monitored for peripheral vascular disease, said thermal image being acquired by a thermal imaging system, said thermal image comprising a plurality of pixels, the value of each pixel corresponding to a skin surface temperature;
analyzing said thermal image to stratify said at least one peripheral body part into a plurality of skin surface regions;
identifying skin surface temperatures for each respective skin surface region based on pixels in said thermal image associated with each region; and
determining, based on temperature changes of said at least one said surface region of said peripheral body part, whether said subject has peripheral vascular disease, said determining comprising any of: exceeding a threshold of the average temperature from another similar said surface region, exceeding a threshold of high-order statistics of temperature from another similar surface region, a comparison of temperatures between said peripheral body part and a second similar peripheral body part of said subject, a comparison of temperatures retrieved from a database, a comparison of temperatures of a similar peripheral body part obtained at a different time, and any combinations hereof, wherein said threshold is calculated based on any of; a histogram of temperature distributions of said skin surface regions, and a color difference of said thermal image of said skin surface region.

12. The system of claim 11, wherein said peripheral body part is any of: arm, leg, hand, foot, fingers, and toes.

13. The system of claim 11, wherein said thermal imaging system is any of: a single-band infrared camera, a multi-band infrared camera in the thermal range, and a hyperspectral infrared camera in the thermal range.

14. The system of claim 11, further comprising:
analyzing said thermal image to stratify a second peripheral body part into a plurality of skin surface regions;
identifying skin surface temperatures for each skin surface region of said similar second peripheral body part based on pixels in said thermal image associated with each respective region to obtain temperature differentials across said stratified skin surface regions;
comparing said temperature differentials of said first and second peripheral body parts; and
determining, as a result of said comparison, whether a subject has peripheral vascular disease.

15. The system of claim 11, wherein identifying said skin surface temperatures based on pixels in said thermal image comprising any of:
averaging pixel values over at least a portion of said skin surface region; and
weighted averaging said pixels over at least a portion of said skin surface region.

16. The system of claim 11, wherein thermal images are acquired of said subject's peripheral body part at different times to assess a progression of peripheral vascular disease over time using a predictive model.

17. The system of claim 16, wherein said predictive model is any of: an autoregressive model, a recursive least square model, and a dynamic state space model.

18. The system of claim 11, wherein determining whether said subject has peripheral vascular disease further comprises:
retrieving, from a database, temperatures of a peripheral body part; and
comparing said retrieved temperature values to said subject's temperature values from a reference thermal image.

19. The system of claim 18, wherein said retrieved temperatures are associated with a peripheral body part of another subject.

20. The system of claim 11, wherein, in advance of analyzing said thermal image, further comprising processing said thermal image to isolate pixels associated with said area of exposed skin.

21. The system of claim 11, further comprising:
storing said subject's temperature values in a patient record; and
saving said patient record to a historical database.

* * * * *